March 1, 1960  L. D. HUFFMAN  2,926,591
CAMERA SUPPORT OR MOUNT
Filed Feb. 13, 1959  2 Sheets-Sheet 1
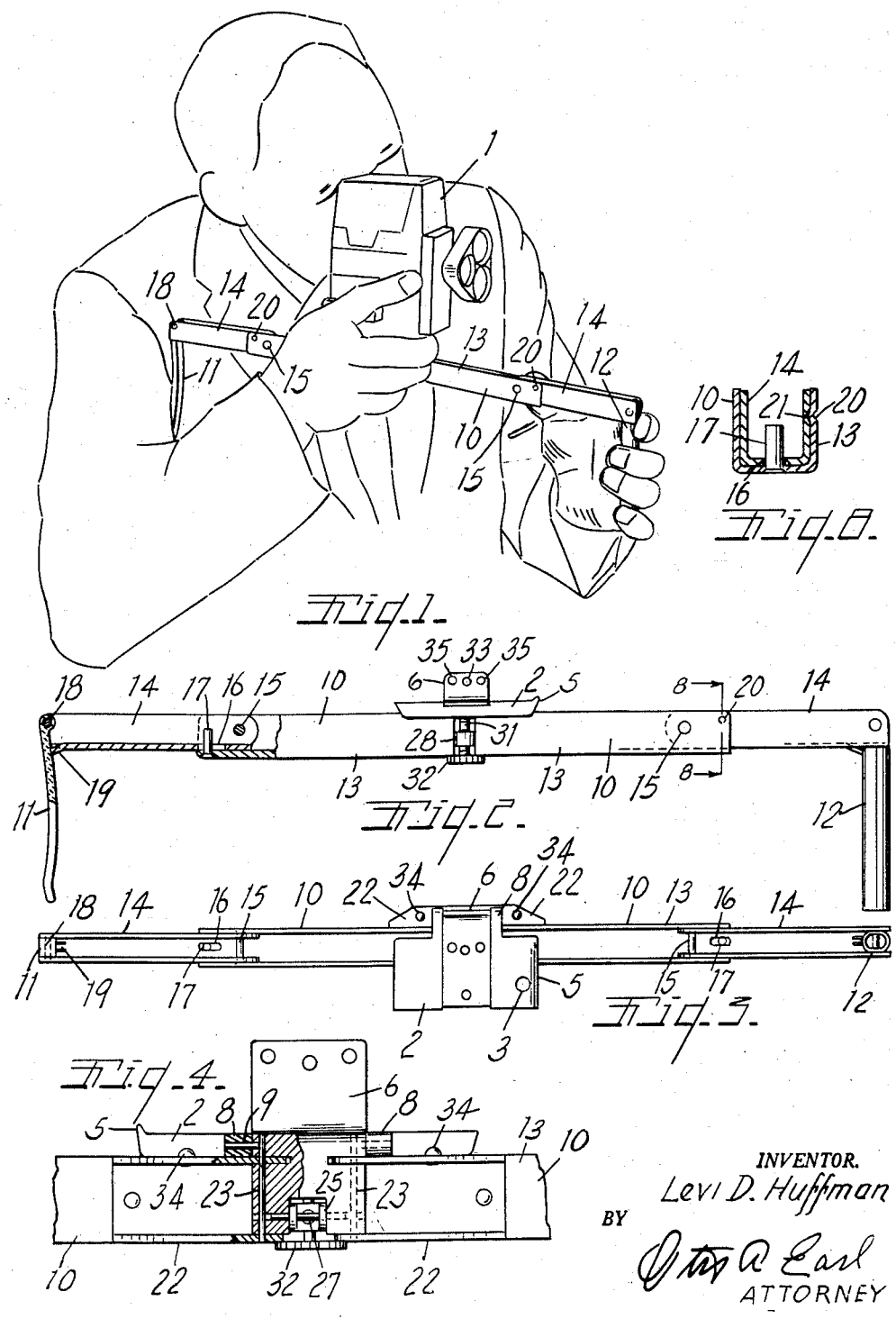
INVENTOR.
Levi D. Huffman
BY
ATTORNEY March 1, 1960  L. D. HUFFMAN  2,926,591
CAMERA SUPPORT OR MOUNT
Filed Feb. 13, 1959  2 Sheets-Sheet 2
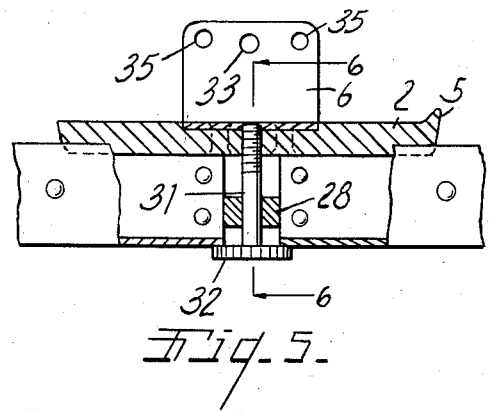
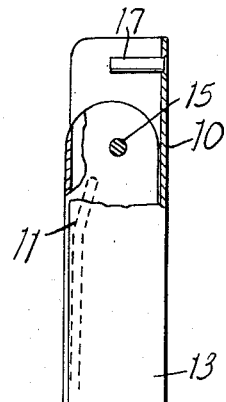
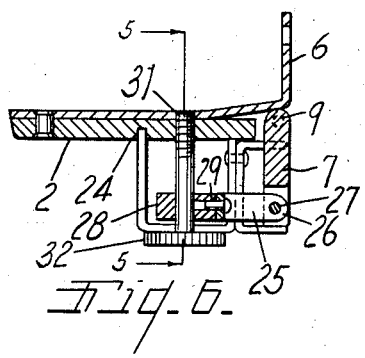
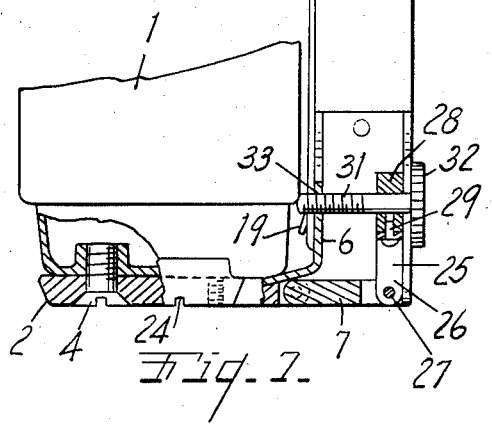
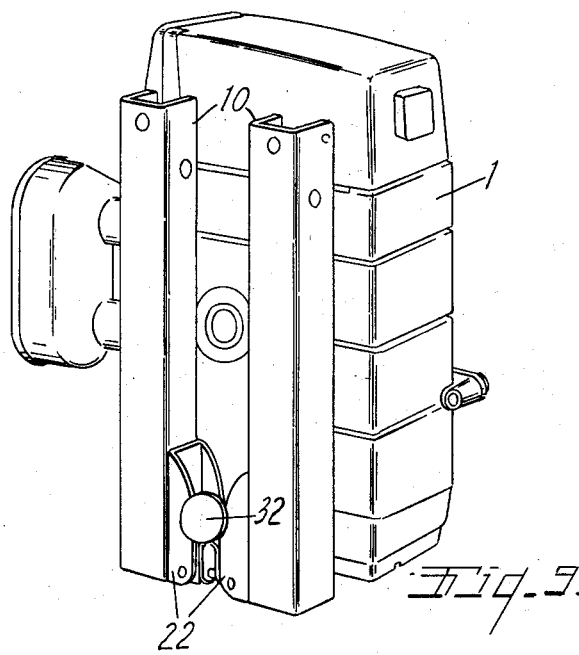
INVENTOR.
Levi D. Huffman
BY
ATTORNEY.

2,926,591
CAMERA SUPPORT OR MOUNT
Levi D. Huffman, Grand Rapids, Mich.

Application February 13, 1959, Serial No. 792,998

16 Claims. (Cl. 95—86)

This invention relates to camera supports or mounts of the shoulder engaging, steady rest type. The main objects of this invention are:

First, to provide a camera mount or support which may be quickly and easily adjusted from collapsed to erected position and vice versa, and one which when in collapsed position is disposed at the side of the camera mounted thereon.

Second, to provide a camera support or mount of the shoulder engaging, steady rest type which is relatively light in weight and at the same time strong and rigid when erected.

Third, to provide a collapsible camera support having these advantages which parts may be very economically produced and assembled.

Objects relating to details and economies of the invention will appear from the description to follow. The invention is defined and pointed out in the claims.

A preferred embodiment of the invention is illustrated in the accompanying drawing, in which:

Fig. 1 is a perspective view of a camera support embodying my invention associated with a figure illustrating the manner of using the same.

Fig. 2 is a side elevational view partially in section of the support in erected position, the stock member being shown in collapsed position by dotted lines.

Fig. 3 is a plan view thereof.

Fig. 4 is an enlarged fragmentary view partially in section illustrating the structural details and the connections for certain of the parts.

Fig. 5 is an enlarged fragmentary view partially in section on a line corresponding to line 5—5 of Fig. 6.

Fig. 6 is a fragmentary view mainly in section on a line corresponding to line 6—6 of Fig. 5.

Fig. 7 is a fragmentary view partially in section illustrating the supporting arms in collapsed position relative to a camera mounted on the base plate of the camera support.

Fig. 8 is a fragmentary sectional view on a line corresponding to line 8—8 of Fig. 2.

Fig. 9 is a perspective view of the support in collapsed position relative to a camera mounted on the support, the camera being shown in conventional form.

In the accompanying drawing the camera support of my invention is illustrated in Fig. 1 in erected use position. The camera, designated by the numeral 1, is conventionalized but it will be understood that the support of my invention is adapted to be used with various types of cameras. The base plate 2 is designed and proportioned to have the camera mounted thereon and is provided with a screw hole 3 for the camera anchoring screw 4. The upturned flange 5 at one edge of the base plate serves to aid in aligning or positioning the camera upon the base plate. The base plate is provided with an upwardly projecting bracket 6 at one side thereof, the purpose of which will appear as the description proceeds. A coupling member 7 is hingedly connected to the base plate at the side thereof from which the bracket projects, the base plate being provided with laterally projecting pivot ears 8 receiving the pivots 9, the coupling member being fittingly disposed between the ears to prevent edgewise movement thereof.

There are two camera supporting arms designated generally by the numerals 10, the inner arm being provided with a shoulder stock 11 and the outer arm with a hand piece 12. The arms are duplicates except as to the grip and stock members thereof, and each comprises an inner arm member 13 and an outer arm member 14 of channel section. The outer arm member is dimensioned to collapse within the inner arm member and is swingably secured thereto by a pivot 15. The web of the outer arm member is provided with a slot 16 adapted to receive the stud or pin 17 disposed on the inner arm member at the outer side of the pivot 15, see Figs. 2 and 3. The width of the slot is such that its edges supportedly engage the pin 17. The inner end of the stock 11 is disposed between the flanges of the outer arm member 14 and swingably secured thereto by the pivots 18 so that it may be collapsed within the outer arm member and the outer arm member collapsed within the inner arm member as is illustrated in Fig. 7.

In the structure illustrated the outer edge portion of the web of the outer arm member is struck downwardly to provide an abutment 19 for the stock when it is in erected position and also to provide a finger piece to facilitate grasping when the arms are collapsed. The grip or hand piece 12 is mounted in the same manner. The outer arm member is provided with a lug 20 engageable with a recess 21 in the side of the inner arm member when the parts are in erected position. As the arm members are formed of sheet metal stock or channel section, there is sufficient springability therein to retain the lug in retaining engagement with the coacting recess. The studs 17 serve as supports for the stock and the hand piece when they are in collapsed position so they are positioned conveniently for grasping and to swing them to erected position, that being one of the main purposes of the studs. The inner arm members are provided with laterally projecting ears 22 at their inner ends, the ears in the embodiment illustrated being of channel section and having knuckle portions connected to the coupling member by the pivots 23 which are disposed in right angular relation to the mounting pivot 9 connecting the coupling member to the base plate, see Fig. 4. With this connection the arms may be adjusted to aligned supporting relation as illustrated in Figs. 1 and 2 and in Fig. 5, in which position the outer flanges thereof, that is outer relative to the pivots of the coupling member, are engageable in the groove 24, see Figs. 6 and 7, and they are clamped in that position by means of a lock member designated generally by the numeral 25. This lock member 25 is adapted to lock or support the arms both in erected position as shown in Figs. 5 and 6 and in collapsed position as shown in Fig. 7, that is, the details are illustrated in these figures.

The member 25 comprises a line-like body portion 26 pivoted at 27 in a recess provided therefor in the swinging edge of the coupling member 7, see Figs. 6 and 7. The screw supporting portion 28 is swiveled at 29 on this portion 26 and has a transverse bore therein 30 rotatably receiving the screw 31 which is provided with a disk-like head 32 knurled to provide a finger piece. When the coupling member is adjusted and the arms are adjusted to the position clearly illustrated in Figs. 2 and 5, the lock member screw may be adjusted on its swivel so that it may be threaded into the opening 3 provided therefor in the base plate. When the arm members are adjusted to collapsed position the lock member may be adjusted to the position shown in Fig. 7 and the screw threaded into the hold 33 in the bracket, see Fig. 7.

When in this position the lugs or studs 34 on the pivot ears 22 engage the holes 35 in the bracket which are positioned to receive the same, the screw in that position clamping the collapsed arms in supported relation to the bracket.

The camera 1 illustrated is of the moving picture type, but it will be understood that the support is adapted for use with other types of cameras.

I have illustrated and described my invention in a highly practical embodiment thereof. I have not attempted to illustrate or describe various modifications and adaptations, as it is believed that this disclosure will enable those skilled in the art to embody and adapt my invention as may be desired.

Having thus described the invention what is claimed as new and desired to secure by Letters Patent is:

1. In combination with a camera, of a support therefor comprising a base plate on which the camera is mounted, said base plate having an upwardly projecting bracket, an arm coupling member pivotally mounted on said base plate for swinging adjustment relative thereto, camera supporting arms, each comprising inner and outer arm members of channel section, the inner ends of the outer arm members being disposed between the flanges of the inner arm members and pivotally connected thereto for swinging adjustment to aligned erected position or to collapsed position between the flanges of the inner arm members, one of said arms having a shoulder stock pivotally mounted between the flanges of its outer member and swingable to erected position in supported engagement with its outer end or to collapsed position between the flanges thereof, the other arm having a hand piece pivotally mounted between the flanges of its outer member and swingable to erected position in supported engagement with its outer end or to collapsed position between the flanges thereof, the inner arm members having spaced laterally projecting ears pivotally mounted on said coupling member for swinging adjustment, said base plate being provided with a groove in its under side positioned to receive corresponding flanges of said inner arm members when the arms are in erected position, a lock member pivotally mounted on said coupling member and having a swiveled outer end portion and an arm clamping screw rotatably mounted on said swiveled outer end portion of said lock member and having an arm clamping head, said base member and said bracket having threaded openings therein with which said screw may be engaged for securing said arms in erected position with the flange thereof disposed within said groove in said base plate or in collapsed supported relation to said bracket and said arms having lugs and openings which are in coacting engagement when the arms are in collapsed position relative to said bracket.

2. In combination with a camera, of a support therefor comprising a base plate on which the camera is mounted, said base plate having an upwardly projecting bracket, an arm coupling member pivotally mounted on said base plate for swinging adjustment relative thereto, camera supporting arms, each comprising inner and outer arm members of channel section, the inner ends of the outer arm members being disposed between the flanges of the inner arm members and pivotally connected thereto for swinging adjustment to aligned erected position or to collapsed position between the flanges of the inner arm members, one of said arms having a shoulder stock pivotally mounted between the flanges of its outer member and swingable to erected position in supported engagement with its outer end or to collapsed position between the flanges thereof, the other arm having a hand piece pivotally mounted between the flanges of its outer member and swingable to erected position in supported engagement with its outer end or to collapsed position between the flanges thereof, the inner arm members having spaced laterally projecting ears pivotally mounted on said coupling member for swinging adjustment, a lock member pivotally mounted on said coupling member and having a swiveled outer end portion and an arm clamping screw rotatably mounted on said swiveled outer end portion of said lock member and having an arm clamping head, said base member and said bracket having threaded openings therein with which said screw may be engaged for securing said arms in erected position or in collapsed position relative to said bracket.

3. In combination with a camera, of a support therefor comprising a base plate on which the camera is mounted, said base plate having laterally projecting ears on one side edge thereof and a bracket projecting upwardly relative to said ears, an arm coupling member disposed between and pivotally mounted on said ears for swinging adjustment relative to the base plate, camera supporting arms, each comprising inner and outer arm members of channel section, the inner ends of the outer arm members being disposed between the flanges of the inner arm members and pivotally connected thereto for swinging adjustment to aligned erected position or to collapsed position between the flanges of the inner arm members, the webs of the inner arm members being provided with studs spaced outwardly relative to the pivotal connection for the outer arm members thereto, the webs of the outer arm members having elongated slots therein engageable with said studs with the edges of the slots in lateral thrust sustaining engagement with said studs when the outer arm members are in erected position, one of said arms having a shoulder stock pivotally mounted between the flanges of its outer member and swingable to erected position in supported engagement with its outer end or to collapsed position between the flanges thereof, the other arm having a hand piece pivotally mounted between the flanges of its outer member and swingable to erected position in supported engagement with its outer end or to collapsed position between the flanges thereof, the other arm having a hand piece pivotally mounted between the flanges of its outer member and swingable to erected position in supported engagement with its outer end or to collapsed position between the flanges thereof, the inner arm members being pivotally mounted on said coupling member for swinging adjustment, and means mounted on said coupling member and adjustable to clamp said arms to said base in erected position or in collapsed position to said bracket in angular relation to said base plate and at the side of a camera mounted thereon.

4. In combination with a camera, of a support therefor comprising a base plate on which the camera is mounted, said base plate having laterally projecting ears on one side edge thereof and a bracket projecting upwardly relative to said ears, an arm coupling member disposed between and pivotally mounted on said ears for swinging adjustment relative to the base plate, camera supporting arms, each comprising inner and outer arm members of channel section, the inner ends of the outer arm members being disposed between the flanges of the inner arm members and pivotally connected thereto for swinging adjustment to aligned erected position or to collapsed position between the flanges of the inner arm members, one of said arms having a shoulder stock pivotally mounted between the flanges of its outer member and swingable to erected position in supported engagement with its outer end or to collapsed position between the flanges thereof, the other arm having a hand piece pivotally mounted between the flanges of its outer member and swingable to erected position in supported engagement with its outer end or to collapsed position between the flanges thereof, the inner arm members being pivotally mounted on said coupling member for swinging adjustment, and means mounted on said coupling member and adjustable to clamp said arms to said base in erected position or in collapsed position to said bracket in angular relation to said base plate and at the side of a camera mounted thereon.

5. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising pivotally connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner arm members being pivotally mounted on said coupling member to be swingably adjusted thereon into aligned use position in supporting relation to said base member or to be collapsed into substantial parallel angular relation thereto, said base plate being recessed on its underside to receive portions of said inner arm members when they are in erected position, a lock member pivotally mounted on said coupling member and having a swiveled outer portion, and an arm clamping screw rotatably mounted on said swiveled outer end portion of said lock member and having an arm clamping head, said base member and said bracket having threaded openings therein with which said screw may be engaged for securing said arms in erected supporting relation to said base plate or in collapsed supported relation to said bracket and said arms having lugs and openings which are in engagement when the arms are in collapsed relation to said bracket.

6. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising pivotally connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner arm members being pivotally mounted on said coupling member to be swingably adjusted thereon into aligned use position in supporting relation to said base member or to be collapsed into substantial parallel angular relation thereto, a lock member pivotally mounted on said coupling member and having a swiveled outer portion, and an arm clamping screw rotatably mounted on said swiveled outer end portion of said lock member and having an arm clamping head, said base member and said bracket having threaded openings therein with which said screw may be engaged for securing said arms in erected supporting relation to said base plate or in collapsed supported relation to said bracket.

7. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising pivotally connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner and outer arm members having springably yieldable means for holding them in erected position relative to each other, said inner arm members being pivotally mounted on said coupling member to be swingably adjusted thereon into aligned use position in supporting relation to said base member or to be collapsed into substantial parallel angular relation thereto, a lock member pivotally mounted on said coupling member and having a swiveled outer portion, and an arm clamping screw rotatably mounted on said swiveled outer end portion of said lock member and having an arm clamping head, said base member and said bracket having threaded openings therein with which said screw may be engaged for securing said arms in erected supporting relation to said base plate or in collapsed relation to said bracket.

8. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising collapsibly connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner and outer arm members having springably yieldable means for holding them in erected position relative to each other, said inner arm members being pivotally mounted on said coupling member to be swingably adjusted thereon into aligned use position in supporting relation to said base member or to be collapsed into substantial parallel angular relation thereto, and means mounted on said coupling member engageable with said base plate to support the arms in erected position relative to said base plate or engageable with said bracket to support the collapsed arms in angular relation to said base plate.

9. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising collapsibly connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner arm members being pivotally mounted on said coupling member to be swingably adjusted thereon into aligned use position in supporting relation to said base member or to be collapsed into substantial parallel angular relation thereto, and means mounted on said coupling member engageable with said base plate to support the arms in erected position relative to said base plate or engageable with said bracket to support the collapsed arms in angular relation to said base plate.

10. A camera support comprising a base plate adapted to have a camera mounted thereon, said base plate having a bracket projecting in angular relation thereto, an arm coupling member pivotally mounted on said base plate for swinging adjustment relative to the base plate and said bracket, supporting arms comprising collapsibly connected inner and outer arm members, the outer arm members being inwardly collapsible upon the inner arm members, one of the outer arm members being provided with a stock member adjustably mounted thereon to be collapsed inwardly thereon or adjusted to a depending angular use relation thereto, the other outer arm member being provided with a hand piece adjustably mounted thereon to be collapsed inwardly thereon or adjusted to depending use relation thereto, said inner arm members being pivotally mounted on said coupling member to be swingably adjusted thereon into aligned use position in supporting relation to said base member or to be collapsed into substantial parallel angular relation thereto, and means mounted on said coupling member and including a pivotal member and a swivel member mounted on the pivotal member and provided with an arm clamping screw engageable with said base plate to support the arms in erected position relative to said base plate or engageable with said bracket to support the collapsed arms in angular relation to said base plate.

11. A camera support comprising a base plate adapted to have a camera mounted thereon, an arm coupling member pivotally mounted on said base plate for swinging adjustment relative thereto, longitudinal collapsible supporting arms comprising an inner and outer arm member, one of the outer arm members being provided with a stock member collapsibly mounted thereon and the other with a hand piece collapsibly mounted thereon, said inner arm members being pivotally mounted on said coupling member to be swingably adjusted thereon into aligned use position in supporting relation to said base plate or to be adjusted with the arms collapsed into substantial parallel angular relation to said base plate, a lock means pivotally mounted on said coupling member and including a clamp element adjustable to engage said base plate for supporting the arms in substantially aligned erected position or in sidewise relation to a camera mounted on said base plate.

12. A camera support comprising a base plate adapted to have a camera mounted thereon, an arm coupling member pivotally mounted on said base plate for swinging adjustment relative thereto, supporting arms, one being provided with a stock member and the other with a hand piece, said arms being pivotally mounted on said coupling member to be swingably adjusted thereon into aligned use position in supporting relation to said base plate or to be adjusted to position the arms in angular relation to said base plate, a lock means pivotally mounted on said coupling member and including an arm engaging member adjustable to engage said base plate for supporting the arms in substantially aligned erected position or in angular relation to said base plate.

13. A camera support comprising a base plate adapted to have a camera mounted thereon, an arm coupling member mounted on the base plate, longitudinally collapsible supporting arms comprising an inner and outer arm members of channel section, the inner arm members being pivotally mounted on said base plate, the outer arm members being disposed between and pivotally connected to the flanges of the inner arm members, the webs of the outer arm members having a portion struck from the outer ends thereof to constitute finger pieces, the webs in the inner arm members being provided with studs spaced outwardly relative to said pivots, the webs of the outer arm members having slots therein receiving said studs when the outer arm members are in erected position, one of said outer arm members having a shoulder stock and the other a hand piece pivotally mounted between the flanges thereof and each swingable to erected position in supported engagement with its outer end or to collapsed position between the flanges thereof in supported engagement with said studs.

14. A camera support comprising a base plate adapted to have a camera mounted thereon, an arm coupling member mounted on the base plate, longitudinally collapsible supporting arms comprising an inner and outer arm members of channel section, the inner arm members being pivotally mounted on said base plate, the outer arm members being disposed between and pivotally connected to the flanges of the inner arm members, the webs in the inner arm members being provided with studs spaced outwardly relative to said pivots, the webs of the outer arm members having slots therein receiving said studs when the outer arm members are in erected position, one of said outer arm members having a shoulder stock and the other a hand piece pivotally mounted between the flanges thereof and each swingable to erected position in supported engagement with its outer end or to collapsed position between the flanges thereof in supported engagement with said studs.

15. A camera support comprising a base plate adapted to have a camera mounted thereon, an arm coupling member mounted on the base plate, longitudinally collapsible supporting arms comprising an inner and outer arm members of channel section, the inner arm members being pivotally mounted on said base plate, the outer arm members being disposed between and pivotally connected to the flanges of the inner arm members, the webs of the outer arm members having a portion struck from the outer ends thereof to constitute finger pieces, one of said outer arm members having a shoulder stock and the other a hand piece pivotally mounted between the flanges thereof and each swingable to erected position in supported engagement with its outer end or to collapsed position between the flanges thereof.

16. A camera support comprising a base plate adapted to have a camera mounted thereon, an arm coupling member mounted on the base plate, longitudinally collapsible supporting arms comprising an inner and outer arm members of channel section, the inner arm members being pivotally mounted on said base plate, the outer arm members being disposed between and pivotally connected to the flanges of the inner arm members, one of said outer arm members having a shoulder stock and the other a hand piece pivotally mounted between the flanges thereof and each swingable to erected position in supported engagement with its outer end or to collapsed position between the flanges thereof.

References Cited in the file of this patent

FOREIGN PATENTS 666,808     Great Britain _____ Feb. 20, 1952